US010837302B2

(12) United States Patent
Smith et al.

(10) Patent No.: US 10,837,302 B2
(45) Date of Patent: Nov. 17, 2020

(54) BLADE TRACK ASSEMBLY, COMPONENTS, AND METHODS

(71) Applicant: Rolls-Royce North American Technologies Inc., Indianapolis, IN (US)

(72) Inventors: Clayton C. Smith, Fillmore, IN (US); George F. Griffiths, Carmel, IN (US); Ted Joseph Freeman, Avon, IN (US); William Westphal, Avon, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 452 days.

(21) Appl. No.: 15/695,476

(22) Filed: Sep. 5, 2017

(65) Prior Publication Data

US 2018/0010474 A1 Jan. 11, 2018

Related U.S. Application Data

(63) Continuation of application No. 14/458,532, filed on Aug. 13, 2014, now Pat. No. 9,784,115, which is a
(Continued)

(51) Int. Cl.
*F01D 11/08* (2006.01)
*F01D 11/00* (2006.01)
*F01D 25/24* (2006.01)

(52) U.S. Cl.
CPC ............ *F01D 11/08* (2013.01); *F01D 11/005* (2013.01); *F01D 25/24* (2013.01);
(Continued)

(58) Field of Classification Search
CPC ........ F01D 11/08; F01D 11/12; F01D 11/122; F01D 11/127; F01D 25/24; F01D 11/005;
(Continued)

(56) References Cited

U.S. PATENT DOCUMENTS 4,247,248 A 1/1981 Chaplin et al.
4,551,064 A * 11/1985 Pask ...................... F01D 11/08
415/115
(Continued)

FOREIGN PATENT DOCUMENTS

GB 2477825 A 8/2011
WO 9744570 11/1997

OTHER PUBLICATIONS

European Office Action issued in connection with European Application No. 12862735.3-1610, dated Sep. 14, 2017, 6 pages.
(Continued)

*Primary Examiner* — Christopher Verdier
(74) *Attorney, Agent, or Firm* — Barnes & Thornburg LLP (57) ABSTRACT

A blade track assembly is disclosed having a variety of features. The assembly can have annular or segmented components, or a combination of the two. In one form the assembly includes blade tracks having a forward and aft edge that can be received in an opening of respective hangers. The hangers can include anti-movement features to discourage movement of a blade track. A rib can extend between hangers and in one form can be used as part of a seal assembly. Clips can be used to secure the blade track in openings of the respective hangers, as well as to discourage movement of the blade track.

8 Claims, 5 Drawing Sheets

Related U.S. Application Data continuation of application No. PCT/US2012/072236, filed on Dec. 30, 2012.

(60) Provisional application No. 61/582,275, filed on Dec. 31, 2011.

(52) U.S. Cl.
CPC ...... *F05D 2230/60* (2013.01); *F05D 2240/11* (2013.01); *Y02T 50/672* (2013.01); *Y10T 29/4932* (2015.01)

(58) Field of Classification Search
CPC ............. F05D 2230/60; F05D 2240/11; Y10T 29/4932; Y10T 29/49323
USPC ................. 415/173.1, 173.3, 173.4, 173.5
See application file for complete search history.

(56) References Cited

U.S. PATENT DOCUMENTS

| | | | |
|---|---|---|---|
| 5,738,490 A | 4/1998 | Pizzi et al. | |
| 6,146,091 A * | 11/2000 | Watanabe | F01D 9/04 |
| | | | 415/111 |
| 6,200,091 B1 | 3/2001 | Bromann et al. | |
| 6,315,519 B1 | 11/2001 | Bagepalli et al. | |
| 6,508,623 B1 * | 1/2003 | Shiozaki | F01D 9/04 |
| | | | 415/115 |
| 6,575,697 B1 | 6/2003 | Arilla et al. | |
| 6,602,048 B2 * | 8/2003 | Fujikawa | F01D 9/00 |
| | | | 415/116 |
| 6,702,550 B2 | 3/2004 | Darkins et al. | |
| 6,733,235 B2 | 5/2004 | Alford et al. | |
| 7,052,235 B2 | 5/2006 | Alford et al. | |
| 7,278,820 B2 | 10/2007 | Keller | |
| 7,556,475 B2 | 7/2009 | Roberts, III et al. | |
| 8,985,944 B2 | 3/2015 | Shapiro et al. | |
| 9,784,115 B2 * | 10/2017 | Smith | F01D 25/24 |
| 2004/0071548 A1 | 4/2004 | Wilson, Jr. | |
| 2005/0004810 A1 | 1/2005 | Tanaka | |
| 2006/0083607 A1 * | 4/2006 | Synnott | F01D 11/08 |
| | | | 415/173.1 |
| 2007/0020095 A1 | 1/2007 | Dierksmeier et al. | |
| 2008/0178465 A1 | 7/2008 | Schiavo et al. | |
| 2009/0010755 A1 | 1/2009 | Keller et al. | |
| 2009/0053050 A1 | 2/2009 | Bruce et al. | |
| 2009/0060747 A1 | 3/2009 | Strock et al. | |
| 2009/0079139 A1 | 3/2009 | Schiavo et al. | |
| 2009/0081033 A1 | 3/2009 | Schiavo et al. | |
| 2009/0226300 A1 | 9/2009 | Knapp et al. | |
| 2009/0266082 A1 | 10/2009 | O'Leary | |
| 2010/0028129 A1 | 2/2010 | Reed | |
| 2010/0092281 A1 | 4/2010 | Habarou et al. | |
| 2012/0163964 A1 * | 6/2012 | Chuong | F01D 25/246 |
| | | | 415/191 |

OTHER PUBLICATIONS

Partial European Search Report, European Patent Application No. 15178939.3-1610, dated Dec. 16, 2015, 8 pages.
Extended European Search Report, European Patent Application No. EP 12 86 2735), dated Jul. 21, 2015, 7 pages.
International Search Report and Written Opinion, PCT/US2013/072236, Rolls-Royce Corporation, dated Jul. 19, 2013, 10 pages.
European Official Action dated Oct. 22, 2018 in connection with EP Patent Application No. 15178939.3, 5 pages.

* cited by examiner

BLADE TRACK ASSEMBLY, COMPONENTS, AND METHODS

CROSS REFERENCE TO RELATED APPLICATIONS

This application is a continuation of U.S. Pat. No. 9,784,115, filed 13 Aug. 2014, which is a continuation of PCT Application Number PCT/US2012/072236, filed 30 Dec. 2012, which claims priority to and the benefit of U.S. Provisional Patent Application No. 61/582,275, filed 31 Dec. 2011, the disclosure of each of which is now expressly incorporated herein by reference.

GOVERNMENT RIGHTS

The present inventions were made with U.S. Government support under contract number N00019-96-C-0176 awarded by the United States Navy. The United States Government may have certain rights in the present inventions.

TECHNICAL FIELD

The present invention generally relates to turbomachinery components, and more particularly, but not exclusively, to gas turbine engine blade tracks.

BACKGROUND

Providing blade track arrangements for turbomachinery components, such as for gas turbine engines, remains an area of interest. Some existing systems have various shortcomings relative to certain applications. Accordingly, there remains a need for further contributions in this area of technology.

SUMMARY

One embodiment of the present invention is a unique blade track assembly. Other embodiments include apparatuses, systems, devices, hardware, methods, and combinations for coupling blade tracks within gas turbine engines. Further embodiments, forms, features, aspects, benefits, and advantages of the present application shall become apparent from the description and figures provided herewith.

DETAILED DESCRIPTION OF THE DRAWINGS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
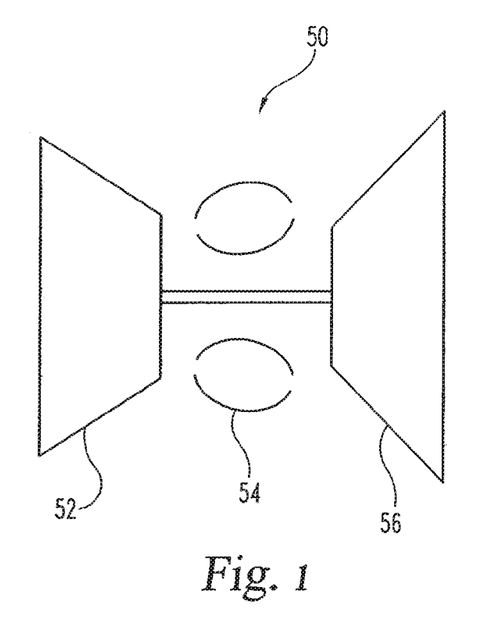
FIG. 1 depicts an embodiment of a gas turbine engine.

With reference to FIG. 1, one embodiment of a gas turbine engine 50 is shown. The gas turbine engine includes a compressor 52, combustor 54, and turbine 56 which operate together to provide power. In one form the gas turbine engine 50 is operable to provide power to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 50 can take a variety of forms in different embodiments. Though depicted as a single spool engine in the illustrated embodiment, in other forms the gas turbine engine 50 can include any number of other spools. The gas turbine engine 50 can be configured as an adaptive cycle and/or variable cycle engine and furthermore can take the form of a turbofan, turbojet, turboprop, or turboshaft engine. Other variations and/or combinations are also contemplated herein.

The gas turbine engine 50 includes turbomachinery components such as the compressor 52 and turbine 56 which each include rotating features such as one or more rows of rotating blades. In some forms the turbomachinery components can also include relatively stationary features such as a row of stator vanes, which can either be fixed in place or of the variable kind. The turbomachinery components can include other features as well. The rotating blades of the turbomachinery components can have a blade track (discussed further below) that is located radially outward of the rotating blades and which can be used to form a flow path for working fluid through the turbomachinery components. In one form the blade tracks provide a surface over which the working fluid flows as the fluid reacts with the rotating blades.

Figure 2:
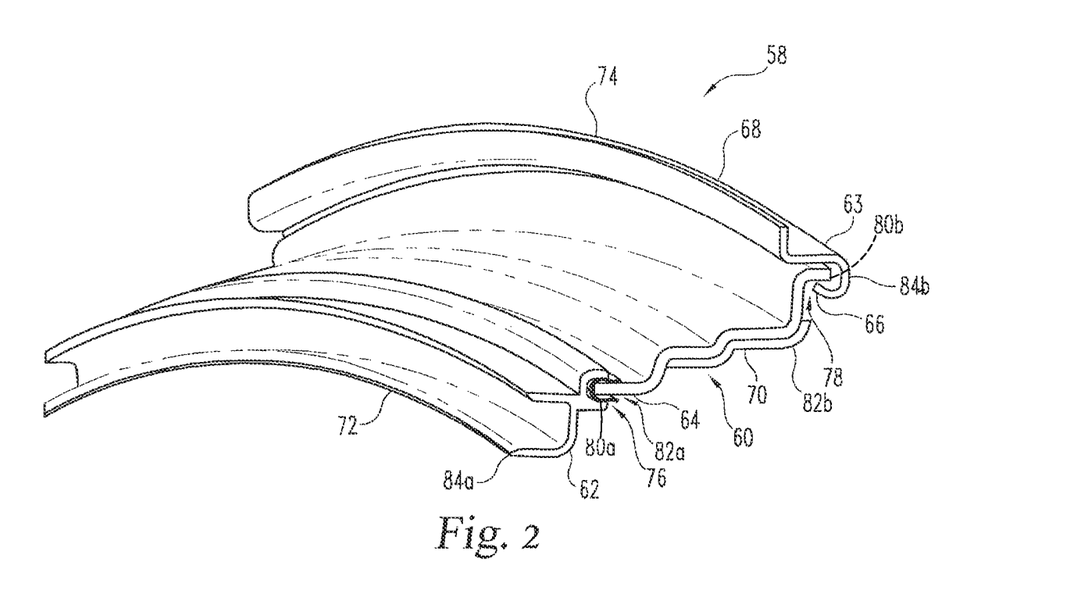
FIG. 2 depicts an embodiment of a blade track assembly.
Figure 3:
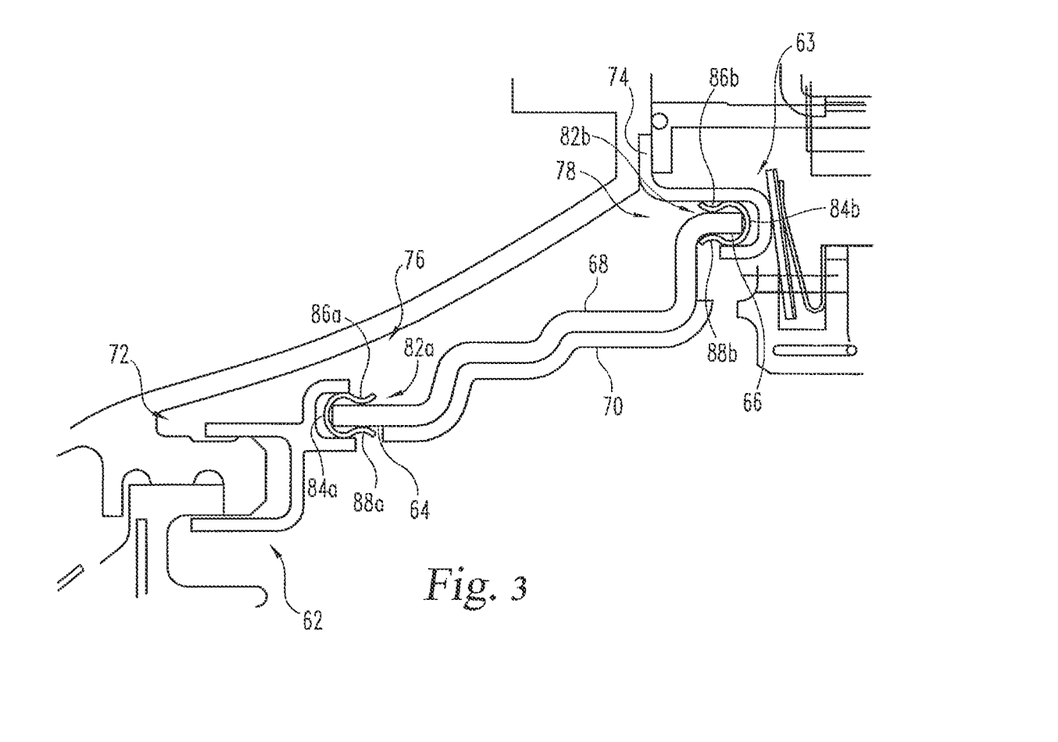
FIG. 3 depicts an embodiment of a blade track assembly.

Turning now to FIGS. 2 and 3, one embodiment of a blade track assembly 58 is disclosed. The blade track assembly 58 includes a blade track 60 extending between hangers 62 and 63. The blade track 60 includes a forward end 64 and aft end 66 and which takes on the form of a generally annular shape that in various embodiments can be either an integral construction or composed of a variety of blade track segments that together form an annular shape. The illustration in FIG. 2 depicts a circumferential portion of the blade track 60 which can be taken to represent either a segment of the blade track 60 or a limited view of an annular blade track 60. The forward end 64 and aft end 66 generally extend circumferentially to form in whole or in part the annular shape of a completed blade track. The forward end 64 and aft end 66 of the blade track 60 are depicted in the illustrated embodiment as being received within respective openings of the forward hanger 62 and aft hanger 63. Either or both ends 64 and 66 can project axially from the blade track 60 along the circumferential length of the blade track 60. Not all forms of the blade track 60, however, need include ends 64 and 66 that project axially. Either or both the ends 64 and 66 can be continuous along the length of the blade track 60, but in some embodiments the blade track 60 can include any number of ends 64 and/or 66.

In the illustrated embodiment the blade track 60 includes a layered construction but not all embodiments need include multiple layers. Not all embodiments, however, need be layered. The blade track 60 of the illustrated embodiment includes a backing 68 and an outer surface 70 which can be coupled together in a variety of manners. In one form the blade track 60 includes a ceramic material, such as a ceramic matrix composite. To set forth just a few non-limiting examples, in the layered arrangement of the illustrated embodiment the outer surface 70 can be a ceramic matrix composite, and in another example the backing 68 is a ceramic matrix composite and the reference numeral 70 indicates a coating applied/affixed/etc to the ceramic matrix composite 68. References to the numeral 68 as the backing and to numeral 70 as the ceramic matrix composite will be understood as being made of convenience only and no limitation is hereby intended regarding the precise form of either 68 or 70 unless stated explicitly to the contrary.

Though the backing 68 and the outer surface 70 are shown having generally the same shape, the shapes and/or thicknesses of either or both the backing 68 and outer surface 70 can be different than that which is depicted. The outer surface 70 is shown as extending along a portion of the backing 68, but in some embodiments the outer surface 70 can extend along the entirety of the backing 68. Other variations of the blade track 60 are contemplated herein.

The forward hanger 62 and aft hanger 63 are depicted in the illustrated embodiment as having different configurations/geometries/attachments/etc, but not all embodiments need be different. The forward hanger 62 and aft hanger 63 of the illustrated embodiment include different radial dimensions such that the forward hanger 62 is relatively radially smaller than the aft hanger 63 such as might be expected when the blade track assembly 58 is used within a turbine section of the gas turbine engine 50. The forward hanger 62 and aft hanger 63 of the illustrated embodiment also include different mechanisms through which they are secured within the gas turbine engine 50. The forward hanger 62 includes an opening 72 through which a relatively static structure (shown best in FIG. 3) of the gas turbine engine 50 can be coupled. As used herein the term "static" refers to any suitable component that is not configured to move in an appreciable sense such as with the rotating shaft of the gas turbine engine. Motions such as from thermal expansion/contraction or movement such as a component under load can fall within the meaning of the term static. The opening 72 is shown having a radially upper side, radially lower side, and a backstop and can be referred to as a u-shape. In some applications the opening 72 can be used to slidingly couple with the relatively static structure of the gas turbine engine 50. Furthermore, the opening 72 can be configured such that it snap-fits to the relatively static structure. Other fastening techniques are contemplated herein. Not all embodiments need include the same layout as the opening 72 depicted in the illustrated embodiment. In some embodiments the forward hanger 62 can incorporate an anti-movement feature that cooperates with an anti-movement feature of the relatively static structure of the gas turbine engine 50. For example, the hanger 62 can include a slot that mates with a pin that extends from and/or is coupled with the relatively static structure of the gas turbine engine 50. Other anti-movement features are contemplated herein.

The aft hanger 63 of the illustrated embodiment includes a protrusion 74 which is used to couple to the gas turbine engine 50 and secure the aft hanger 63 in place. The protrusion 74 can be a flange that is received within a corresponding opening or against a corresponding surface of the gas turbine engine 50. The protrusion 74 can extend circumferentially and radially as depicted, but other variations are also contemplated. To set forth just one non-limiting example, the protrusion 74 can extend axially. The protrusion 74 can be any length and need not be continuous along the length of the aft hanger 63. In some forms the aft hanger 63 can be secured to a relatively static portion of the gas turbine engine 50 via one or more pins. For example, a pin can extend from the relatively static structure of the gas turbine engine 50 and through an opening of the protrusion 74 to discourage relative movement between the two. Other forms of anti-movement features are contemplated herein.

Either or both the forward hanger 62 and aft hanger 63 can include additional and/or alternative anti-movement features that are located at split lines between adjacent segmented blade tracks 60. In some forms the anti-movement features can be used to discourage relative movement of blade tracks 60.

Alternatively and/or additionally, the anti-movement features can be used to assist in aligning or maintaining position of the blade tracks 60 relative to each other and/or relative to the hangers 62 and 63. For example, in one non-limiting embodiment either or both of the hangers 62 and 63 can include dimples that line up between the split lines of the blade tracks 60. An edge of the blade track 60 can engage the dimple to, for example, circumferentially locate the blade track 60. In some forms the anti-movement features can be used to ensure a spacing between neighboring blade tracks 60. In another non-limiting embodiment the anti-movement feature can be a pin. Other variations are also contemplated herein.

The openings 76 and 78 in the forward hanger 62 and aft hanger 63, respectively, through which the blade track 60 is received can have different shapes/sizes/geometries/etc, but some embodiments need not be different. For example, the distance between the radially inner portion and radially outer portion of the opening 76 can be different than the distance between the radially inner portion and radially outer portion of the opening 78. The depth of each opening 76 and 78 can likewise be different in some embodiments, but other embodiments need not be different. The openings 76 and 78 of the illustrated embodiment are generally u-shaped having a radially inner and outer portion along with a backstop, but other embodiments can include different shapes. The openings 76 and 78 are generally structured to slidingly receive the forward end 64 and aft end 66 of the blade track 60.

In one non-limiting embodiment of the blade track assembly 58, clips 80a and 80b are used to couple the blade track 60 to the forward hanger 62 and aft hanger 63, respectively. Although the illustrated embodiment depicts clips 80a and 80b used in both, some embodiments may not include clips 80a and 80b in either or both forward hanger 62 and aft hanger 63. In one form the clips 80a and 80b are capable of flexing in response to a stress, for example when the blade track 60 is coupled with the clips. For example, the clips can have openings 82a and 82b that are sized smaller than a dimension of the blade track 60 such as its thickness. Such capability to flex can be used to provide a compressive holding force to the blade track 60 when it is inserted through the openings 82a and 82b.

The clips 80a and 80b of the illustrated embodiment include rounded bodies 84a and 84b extending between ends 86a/86b and 88a/88b. The rounded bodies 84a and 84b can be sized to fit within the openings 76 and 78 and in one form are sized to interact in an interference fit. The round bodies 84a and 84b can be flexible such that a fit within the openings 76 and 78 create a stress to secure the clips 80a and 80b. The ends 86a/86b and 88a/88b of the illustrated embodiment are turned away from the openings 76 and 78, but other forms are also contemplated herein.

The clips 80a and 80b in the illustrated embodiment extend along an arc corresponding to the openings 76 and 78, and can be an integral annular shape, or segmented, depending on the application. In some embodiments the clips 80a and 80b can correspond to the length of a segmented blade track 60, but some embodiments can have different lengths. If segmented, the clips 80a and 80b can be placed within an opening 76 or 78 of a segmented blade track 60, or can span a split line between two or more adjacent blade tracks 60. Furthermore, in those embodiments having segmented clips 80a and 80b, not all segments need have the same configuration and/or shape. Variations other than those depicted or discussed are contemplated herein. Though the clips 80a and 80b are shown as having similar configurations, other embodiments of the blade track assembly 58 may include clips having different configurations and sizes, among other possible differences.

Figure 4:
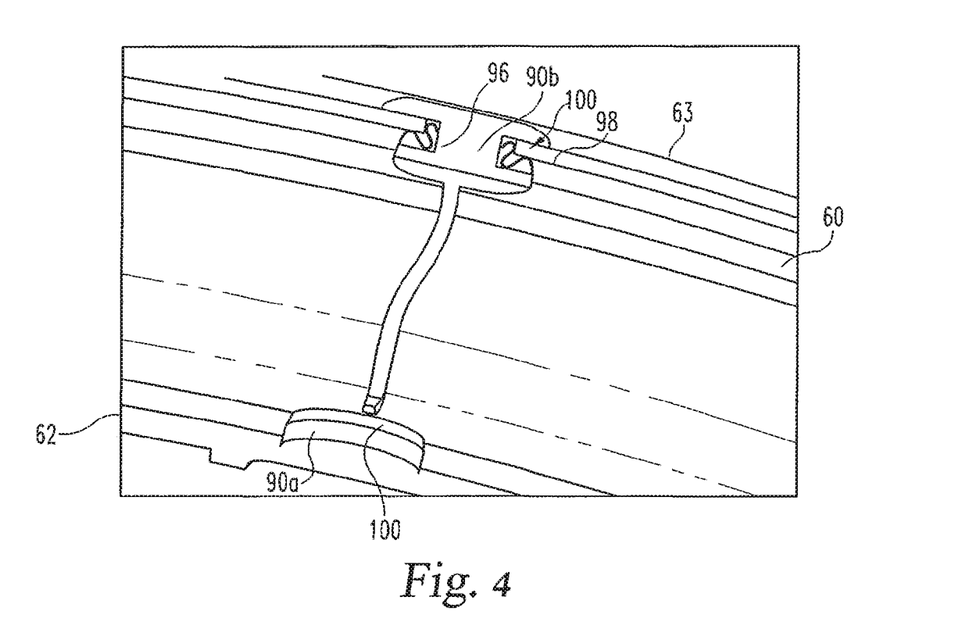
FIG. 4 depicts an embodiment of a blade track assembly.
Figure 5:
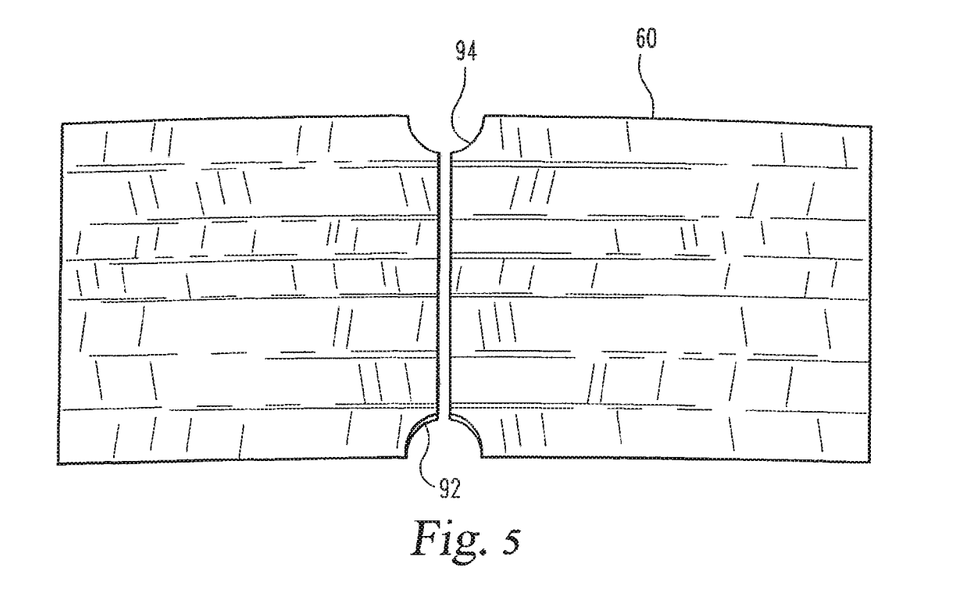
FIG. 5 depicts an embodiment of a blade track.

Turning now to FIGS. 4 and 5, the hangers 62 and 63 can optionally include anti-movement features that are structured to interact with corresponding anti-rotation features of the blade track 60 to discourage relative movement between the two. In the illustrated embodiment the hangers 62 and 63 include anti-movement features 90a and 90b in the form of posts that can be used to interact with anti-movement features 92 and 94 (shown with respect to a blade track 60 in FIG. 5) in the form of cutouts. Different configurations of anti-movement features on either or both the hangers 62 and 63 and the blade track 60 are contemplated herein. It should be apparent from the illustration of FIG. 4 that a portion of the hanger 63 is not depicted so that a view of the anti-movement feature 90b can be shown in better detail. One or more portions of the anti-movement features 90a and 90b can take a form similar to that of the anti-movement features 92 and 94. In the illustrated embodiment the anti-movement features 90a and 90b are in the form of semi-circular posts that include an extension 96 and a base 98. The semi-circular posts can conform in shape to the semi-circular cutout of the blade track 60. The anti-movement features 90a and 90b can be integral with the hangers 62 and 63, or can alternatively be welded/brazed/attached to the hangers 62 and 63.

Other variations are contemplated herein for the configuration/shape/etc of the anti-movement features of the blade track 60 and hangers 62 and 63. Though one embodiment of a segmented blade track 60 is depicted as having the anti-movement features 92 and 94 arranged at its corners, some embodiments can include anti-movement features 92 and 94 located elsewhere. Furthermore, the blade track 60 can have any number of anti-rotation features other than the numbers shown in the illustrated embodiment. For example, some embodiments can include anti-rotation features at one or more corners and additional anti-rotation feature(s) located at a position intermediate to the corners. Other embodiments of the hangers 62 and 63 can likewise include any number of anti-rotation features and can be situated in a variety of locations. Some forms of segmented hangers 62 and 63 can be arranged such that neighboring hangers combine to create an anti-rotation feature that can used to discourage relative movement with a blade track 60. For example, the semi-circular embodiment of the anti-rotation feature shown in the illustrated embodiment can be shared between neighboring segmented hangers such that each contributes a part of the semi-circular shape. Other variations and combinations are contemplated for the anti-rotation features of both blade track 60 and hangers 62 and 63.

In the illustrated embodiment a clip 100 can be used to further discourage relative movement and/or secure one or more of the blade track 60 and hangers 62 and 63. Some embodiments of the blade track assembly 58 may not include the clip 100. In one form, the clip 100 is flexible and can act as a spring to resist relative motions. To set forth just one non-limiting example, the clip 100 can include multiple flexible portions that resist motion in one or more directions. Such multiple flexible portions can be separately made and working in conjunction together, whether coupled or not, or can be an integral clip having multiple separate portions. In the illustrated embodiment the clip 100 is located around the anti-movement feature 90a and 90b and is located between multiple surfaces of the hangers 62 and 63 and blade track 60. Specifically the clip 100 is located in the illustrated embodiment between the base 98 and an edge of the blade track 60 and is also located between the extension 96 and another edge of the blade track 60.

Figure 6:
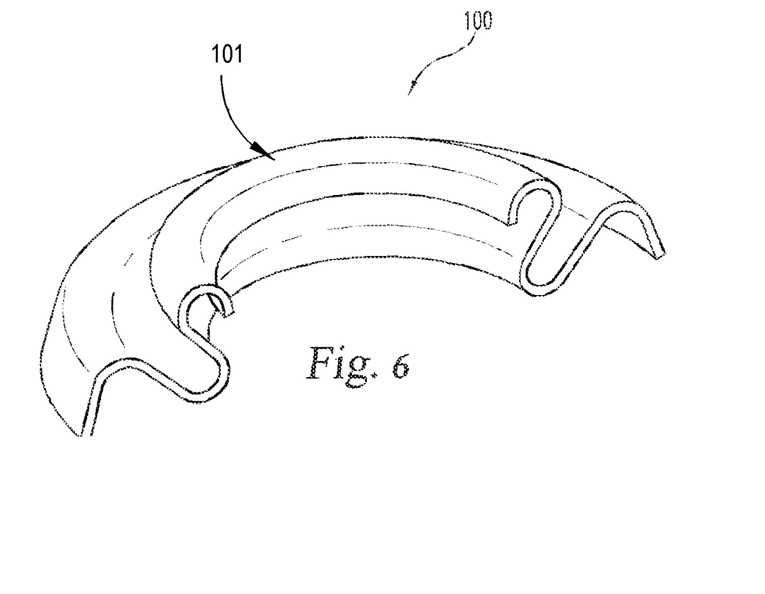
FIG. 6 depicts an embodiment of a clip.

FIG. 6 depicts a view of one embodiment of the clip 100. Though the clip 100 is shown as semi-circular in shape, other embodiments of the clip 100 can have other shapes. In one form, the clip 100 includes multiple portions that can be used collectively to discourage movement in multiple directions as will be described below with regard to the illustrated embodiment. In general, the multiple portions of the clip 100 can be separate, or can be coupled together in an assembly or as an integral clip. The clip 100 includes a portion having a raised body 101 that can act to discourage relative radial movement between the blade track 60 and the hanger 63, another portion located near a corner between the extension 96 and the base 98, and another portion located between the extension 96 and a surface of the blade track 60 that can discourage relative circumferential and/or axial movement. The raised body 101 that discourages relative radial movement can take on different forms in other embodiments. The portion located between the extension 96 and the surface of the blade track 60 that discourages relative circumferential and/or axial movement can take on other forms in different embodiments. The clip 100 is not limited to an orthogonal corner between surfaces as depicted but can be used in other settings whether or not a turn associated with the surfaces is at ninety degrees.

Figure 7:
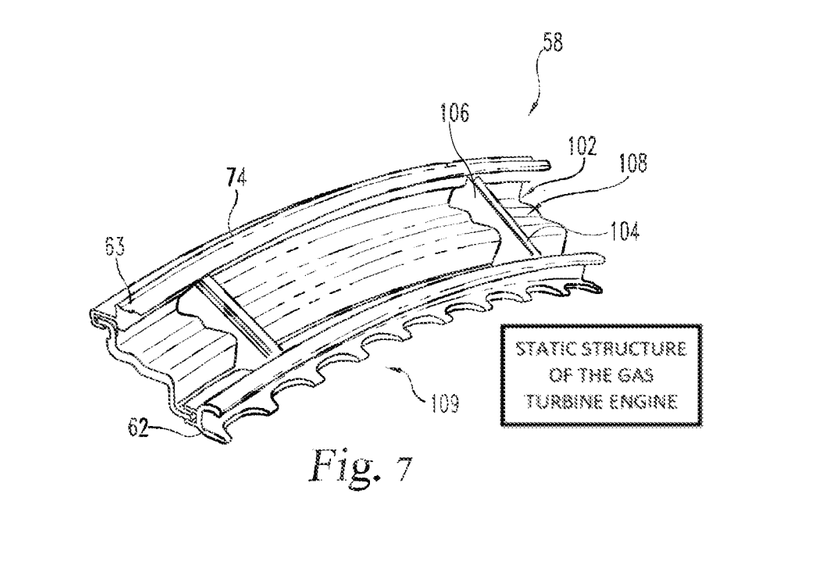
FIG. 7 depicts an embodiment of a blade track assembly.
Figure 8:
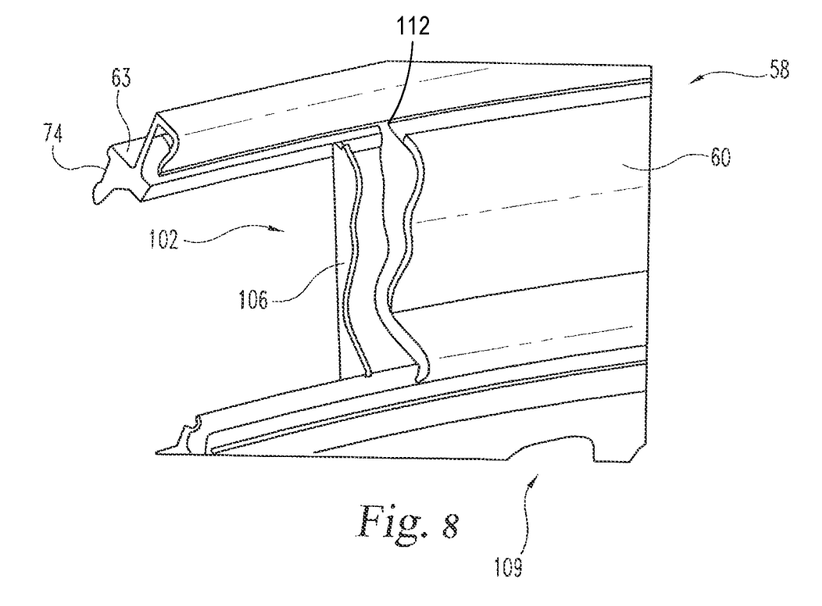
FIG. 8 depicts an embodiment of a blade track assembly.

Turning now to FIGS. 7 and 8, one form of the blade track assembly 58 includes a rib 102 that extends between the hangers 62 and 63. In one embodiment, the rib 102 is coupled or secured to one or both of the hangers 62 and 63. In one form, the rib 102 is made of sheet metal, but other constructions/materials/etc are also contemplated herein. The rib 102 can partially extend between the hangers 62 and 63 in some embodiments. In the illustrated embodiment, the rib 102 includes a backplate 104 and sides 106,108 that together form au-shaped rib 102. The backplate 104 of the illustrated embodiment includes a depression forming a u-shape, but other embodiments of the backplate 104 can take on a variety of different forms.

The sides 106 and 108 can be used to engage one or more blade tracks 60 forming a seal to discourage a working fluid from flowing between blade tracks 60. For example, in one non-limiting embodiment the rib 102 can straddle a split line between segmented blade tracks 60 such that each side 106 and 108 engages different blade tracks 60. FIG. 8 shows a view of the rib 102 oriented to straddle a split line 112 between neighboring blade tracks 60, although only one blade track is illustrated for ease of viewing. The sides 106 and 108 can have ends that conform to the shape of the blade track 60, although in some embodiments the ends of the sides 106 and 108 need not conform to the blade track 60 at portions or along the entire dimension of the blade track 60.

FIGS. 7 and 8 also illustrate yet further embodiments of the hangers 62 and 63. For example, hanger 62 in the illustrated embodiment depicts a scalloped edge 109 in one portion of the hanger 62 that forms the opening 72. The scalloped edge can be used to interact with corresponding features in a static structure of the gas turbine engine 50 to place the hanger in position and/or further secure it, among other possible reasons. The protrusion 74 of hanger 63 is also arranged as yet another embodiment that includes an axial extension.

Figure 9:
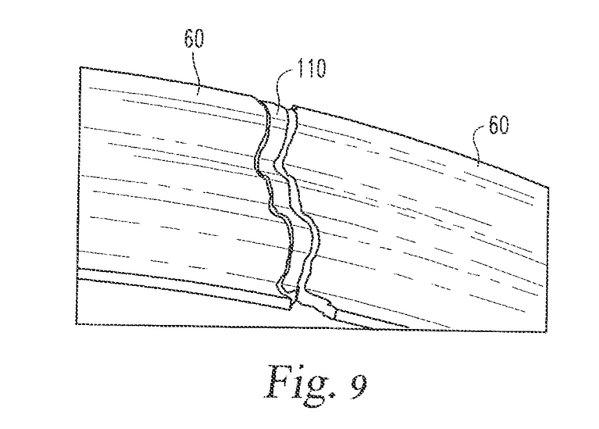
FIG. 9 depicts an embodiment of a blade track.

In an embodiment depicted in FIG. 9, a blade track 60 can be configured to include a raised portion 110 that engages with the rib 102 (shown in FIGS. 7 and 8). In one non-limiting form the raised portion 110 can engage one of the sides 106 and 108 substantially along the dimension of the blade track 60 to discourage a working fluid from moving through a split line 112 between adjacent blade tracks 60 and dispersing on the back side of the blade tracks 60. The raised portion 110 can be any height difference as measured from a reference point. For example, though an edge of the blade track 60 is shown as raised relative to a middle portion of the blade track segment, some embodiments may include a middle portion that is raised relative to an end portion of the blade. The end portion can be, for example, stepped down from the middle portion of the blade track segment 60. The raised portion 110 can include a stepped portion that interacts with the rib 102 on its lateral side, or the apex of the raised portion 110 can interact directly with the rib 102. Other variations of a raised seal arrangement are contemplated.

Any of the features of the embodiments described above can be combined with each other to create any number of various embodiments. For example some forms of the blade track assembly 58 can include hangers 62 and 63 without dimples on split lines between blade tracks 60, but include the clip 100 and anti-movement features to secure the one or more hangers to a static structure of the gas turbine engine 50. In another non-limiting example, a rib 102 can be used in some blade track assemblies 58 along with a clip 80a and anti-movement feature 90b. In some embodiments, the upstream side of the blade track assembly 58 can include similar features as those on the downstream side of the blade track assembly 58, but not all embodiments need do so. Numerous other combinations and variations are also contemplated.

One aspect of the instant application provides an apparatus comprising a gas turbine engine having a blade track that includes a main body and fore and aft edges that extend axially and circumferentially, the blade track supported by a gas turbine engine structure having a receiving portion into which the fore and aft edges can be slidingly inserted.

A feature of the present application provides wherein the receiving portion includes a radially inner member and a radially outer member for receiving into the receiving portion, and wherein the gas turbine engine structure includes a plurality of hangers having the receiving portion.

Another feature of the present application provides wherein the gas turbine engine blade track includes a plurality of segmented blade tracks.

Yet another feature of the present application provides wherein at least one of the circumferentially extending fore and aft edges extends a substantial length of the blade track.

Still another feature of the present application provides wherein the gas turbine engine structure includes a plurality of segmented hangers each having a receiving portion.

Still yet another feature of the present application further includes a u-shaped clip structured to grip the blade track and shaped to fit within the receiving portion of the gas turbine engine structure.

A further feature of the present application provides wherein the gas turbine engine structure is an intermediate structure having the receiving portion for receiving one of the fore and aft circumferentially extending edges and a second receiving portion for receiving a protrusion of a static structure of the gas turbine engine.

Yet a further feature of the present application provides wherein the receiving portion includes a radially inner and a radially outer member that create a channel for receipt of the blade track, and the second receiving portion includes a second radially inner and a second radially outer member that create a second channel for receipt of the protrusion of the static structure.

Another aspect of the instant application provides an apparatus comprising a pair of gas turbine engine blade track coupling members useful for securing a blade track at an upstream end and a downstream end, each of the pair of blade track coupling members having a u-shaped channels shaped to receive respective ends of the blade track.

A feature of the present application further includes a gas turbine engine having a turbine section in which is disposed the gas turbine engine blade track coupling members, wherein the pair of gas turbine engine blade track coupling members are not identical, and wherein one of the pair of gas turbine engine blade track coupling members interacts with an anti-rotation member to discourage movement of the gas turbine engine blade track coupling members.

Another feature of the present application provides wherein at least one of the pair includes a blade track anti-rotation member structured to discourage circumferential movement of the blade track, and wherein at least one of the pair includes a coupling member anti-rotation member structured to discourage circumferential movement of the at least one of the pair of blade track coupling members relative to a static structure of a gas turbine engine.

Yet another feature of the present application provides wherein the gas turbine engine blade track includes a plurality of blade tracks, wherein at least some of the plurality of blade tracks include a cutout structured to engage the anti-rotation member, and which further includes a spring clip located between the anti-rotation member and at least one of the plurality of blade tracks.

Still yet another feature of the present application provides wherein a first of the pair of a gas turbine engine blade track coupling members includes another u-shaped channel, the another u-shaped channel offset from the u-shaped channel and configured to receive a structure of a gas turbine engine configured to locate the first of the pair within the engine.

A further feature of the present application provides wherein a first of the pair of a gas turbine engine blade track coupling members includes an extension structured to be slidingly engaged with a static structure of a gas turbine engine.

A still further feature of the present application further includes a clip inserted into one of the u-shaped channels and having an opening to receive one of the upstream end and downstream end of the blade track, and wherein the pair of coupling members include an alignment feature to circumferentially locate a blade track.

Yet still a further feature of the present application provides wherein the pair of gas turbine engine blade track coupling members includes a member extending axially to couple the pair together.

Yet another aspect of the instant application provides an apparatus comprising a flexible gas turbine engine clip having an opening disposed between a top end and a bottom end of a curvilinear clip body operable to flex when an blade track is inserted through the opening, the engine clip extending in an arc and structured to fit within a circumferentially extending slot of a gas turbine engine static structure.

A feature of the present application provides wherein the engine clip is constructed to withstand relatively elevated temperatures within a turbine section of a gas turbine engine.

Another feature of the present application provides wherein the top end is disposed in a top flared portion of the clip that is configured to turn away from the opening.

Yet another feature of present application provides wherein the top flared portion engages the blade track when installed and a flexible nature of the clip creates a compressive holding force with the blade track.

Still yet another feature of the present application further includes a gas turbine engine having a plurality of the flexible gas turbine engine clips arranged in the circumferentially extending slot around an annulus of turbine section of a gas turbine engine.

Yet still another feature of the present application further includes a plurality of segmented blade tracks having a coupling portion engaged with the plurality of the flexible gas turbine engine clips.

A further feature of the present application provides wherein a top flared portion of the gas turbine engine clip compressingly engages a surface of the circumferentially extending slot of a gas turbine engine static structure.

Still yet another aspect of the instant application provides an apparatus comprising a gas turbine engine blade track retention device in a form of an arcuate corner spring having a material selected to operate in a gas turbine engine environment and including a curvilinear shape with a first compressive portion and a second compressive portion, the first compressive portion operable to compress in a first direction and the second compression portion operable to compress in a second direction, the gas turbine engine blade track retention device operable to discourage movement of a blade track relative to a gas turbine engine by operation of a compressive nature of the first compressive portion and second compressive portion.

A feature of the present application provides wherein the arcuate corner spring extends in a semi-circular shape and the blade track is a turbine blade track.

Another feature of the present application provides wherein the second compressive portion of the arcuate corner spring includes a rounded shape.

Yet another feature of the present application provides wherein the rounded shape includes a first rounded portion and a second rounded portion, the first rounded portion configured to engage a static structure of the gas turbine engine and the second rounded portion configured to engage the blade track, and wherein the material is selected to operate in a turbine section of the gas turbine engine.

Still yet another feature of the present application further includes a gas turbine engine having a blade track, the blade track including a portion operable to engage with a static structure of the gas turbine engine, the arcuate corner spring disposed between the static structure and the blade track.

A further feature of the present application provides wherein the arcuate corner spring discourages air flow between the components by providing sealing contacts on both the static structure and the blade track.

A still further feature of the present application provides wherein arcuate corner spring provides two sealing contacts on both the static structure and the blade track.

A further aspect of the instant application provides an apparatus comprising a gas turbine engine blade track segment circumferentially extending between a first arc end and a second arc end and having a radially inner side and a radially outer side, the radially outer side having a raised seal portion disposed near the first arc end of the blade track segment and structured to engage a sealing member to discourage passage of a working fluid between the inner side and the outer side.

A feature of the present application provides wherein the raised seal portion extends to the first arc end of the blade track segment.

Another feature of the present application provides wherein the raised seal portion includes a face having a surface operable to engage the sealing member.

Still another feature of the present application provides wherein the gas turbine engine blade track segment includes another raised seal portion the second arc end of the blade track segment.

Yet still another feature of the present application provides wherein the raised seal portion and the another raised seal portion are mirror opposites.

A further feature of the present application includes a gas turbine engine having a plurality of the gas turbine engine blade track segments around a turbine section of the gas turbine engine.

A still further feature of the present application provides wherein a split line between neighboring blade track segments is sealed with a member that engages raised seal portions on each of the blade track segments.

Still a further aspect of the instant application provides an apparatus comprising a gas turbine engine having a blade track that includes a plurality of segmented track members at least some of which have a seal surface formed in a surface of the segmented track members opposite from a flow path side of the segmented track members, a first and second coupling component structured to support at least two of the segmented track members, and a seal forming member extending from the first and second coupling components and configured to engage the seal surface of the segmented track members.

A feature of the present application provides wherein the first coupling component includes a plurality of segmented first coupling components.

Another feature of the present application provides wherein the seal forming member extends between the first and second coupling components.

Still another feature of the present application provides wherein the seal forming member is sheet metal, and wherein at least one of the first and second coupling components includes an alignment feature useful to circumferentially position a segmented track member.

Yet still another feature of the present application provides wherein each of the plurality of segmented track members includes a seal surface.

A further feature of the present application provides wherein each of the plurality of segmented track members includes a plurality of seal surfaces.

A still further feature of the present application further include a plurality of seal forming members useful at the split line between two segmented track members, wherein lateral edges of the seal forming members engage a circumferential edges of the seal surfaces.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
a first blade track segment adapted to extend partway around a central axis of a gas turbine engine, the first blade track segment having a forward end, an aft end spaced apart axially from the forward end, a radially inner side, and a radially outer side opposite the radially inner side of the first blade track segment,
a second blade track segment having a forward end, an aft end spaced apart axially from the forward end, a radially inner side, and a radially outer side opposite the radially inner side of the second blade track segment,
a hanger assembly adapted to extend circumferentially about the central axis and support the first and second blade track segments, the hanger assembly including a circumferentially extending forward hanger that receives the forward ends of the first and second blade track segments, a circumferentially extending aft hanger that receives the aft ends of the first and second blade track segments, and an axially extending first rib that interconnects the forward hanger and the aft hanger,
wherein the first rib engages a portion of the radially outer side of the first blade track segment and a portion of the radially outer side of the second blade track segment,
wherein the hanger assembly further includes an axially extending second rib that interconnects the forward hanger and the aft hanger and the second rib is spaced apart circumferentially from the first rib.

2. The apparatus of claim 1, wherein the first rib is u-shaped and includes a backplate, a first side that extends away from the backplate, and a second side that extends away from the backplate.

3. The apparatus of claim 2, wherein the first side includes an end that conforms to a shape of the radially outer side of the first blade track segment and the second side includes an end that conforms to a shape of the radially outer side of the second blade track segment.

4. The apparatus of claim 3, wherein the backplate is formed to include a u-shaped depression.

5. The apparatus of claim 1, wherein the first rib includes a first side having an end that conforms to a shape of the radially outer side of the first blade track segment and a second side that has an end that conforms to a shape of the radially outer side of the second blade track segment.

6. An apparatus comprising:
a first blade track segment adapted to extend partway around a central axis of a gas turbine engine, the first blade track segment having a forward end, an aft end spaced apart axially from the forward end, a radially inner side, and a radially outer side opposite the radially inner side of the first blade track segment,
a second blade track segment having a forward end, an aft end spaced apart axially from the forward end, a radially inner side, and a radially outer side opposite the radially inner side of the second blade track segment,
a hanger assembly adapted to extend circumferentially about the central axis and support the first and second blade track segments, the hanger assembly including a circumferentially extending forward hanger that receives the forward ends of the first and second blade track segments, a circumferentially extending aft hanger that receives the aft ends of the first and second blade track segments, and an axially extending first rib that interconnects the forward hanger and the aft hanger,
wherein the first rib engages a portion of the radially outer side of the first blade track segment and a portion of the radially outer side of the second blade track segment,
wherein the forward hanger includes a first u-shaped member and a second u-shaped member, the first u-shaped member extends in an aft direction and is formed to define an opening that receives the forward end of the first and second blade track segments, the second u-shaped member extends in a forward direction and includes a scalloped edge configured to interact with a corresponding feature included in a static structure of the gas turbine engine.

7. The apparatus of claim 6, wherein the first blade track segment further includes a first arc end and a second arc end spaced apart circumferentially from the first arc end, the radially outer side of the first blade track segment includes a first raised seal portion disposed near the first arc end of the first blade track segment, and the first raised seal portion is configured to engage the first rib to discourage passage of a working fluid between the radially inner side and the radially outer side of the first blade track segment.

8. The apparatus of claim 7, wherein the radially outer side of the first blade track segment further includes a second raised seal portion disposed near the second arc end of the first blade track segment.

* * * * *